United States Patent [19]

Ban et al.

[11] 3,997,129
[45] Dec. 14, 1976

[54] MAGNETIC RECORDING/REPRODUCING APPARATUS

[75] Inventors: Itsuki Ban, 829, Higashioizumi, Nerima, Tokyo; Kazunori Mochizuki, Nagano, both of Japan

[73] Assignee: Itsuki Ban, by said Kazunori Mochizuki, a part interest

[22] Filed: Feb. 9, 1976

[21] Appl. No.: 656,373

[30] Foreign Application Priority Data

Feb. 12, 1975  Japan ................... 50-16949
Apr. 16, 1975  Japan ................... 50-45338

[52] U.S. Cl. ................... 242/201; 74/483 PB; 242/204; 242/208; 242/209
[51] Int. Cl.[2] ................. G11B 15/30; G11B 15/29; G11B 15/22
[58] Field of Search ......... 242/201, 202, 203, 204, 242/198, 208, 209, 206, 210, 67.4 R; 74/483 PB; 360/90

[56] References Cited

UNITED STATES PATENTS

| | | | |
|---|---|---|---|
| 3,554,465 | 1/1971 | Maukawa | 242/201 |
| 3,813,690 | 5/1974 | Oka | 242/201 |
| 3,861,620 | 1/1975 | Sekiguki | 242/201 |

*Primary Examiner*—George F. Mautz
*Attorney, Agent, or Firm*—Lane, Aitken, Dunner & Ziems

[57] ABSTRACT

In a magnetic recording/reproducing apparatus having a plurality of push-buttons for directing changeover of tape drive modes, a simple and compact mechanism for effecting mode changeover including an idler, a reciprocating member, sliding actuating bars and an alternative-selection mechanism, all operated by the motive force from a motor-driven capstan. The idler is mounted for movement into and out of contact with a wheel mounted for rotation with the capstan and the reciprocating member moves responsive to the movement of the idler. The idler can be carried to a position spaced from the capstan wheel by the movement of the reciprocating member. Actuating bars, one associated with each push-button, are engaged and disengaged with the reciprocating member by an alternative selection mechanism. By manually depressing one of the push-buttons, the idler is brought into contact with the capstan wheel, and the corresponding actuating bar is brought into engagement with the reciprocating member, thus effecting the selected mode changeover.

17 Claims, 16 Drawing Figures

MAGNETIC RECORDING/REPRODUCING APPARATUS

BACKGROUND OF THE INVENTION

This invention relates to a magnetic recording/reproducing apparatus and more particularly to an apparatus for changeover between tape-drive modes such as stop, recording/reproducing, fast-feed, rewind and the like for a cassette-contained magnetic tape, wherein mode changeover is performed by manual push-button operation which requires only a very small operating force.

In one prior art mode changeover apparatus, a support carrying a magnetic head and a pinch roller is moved into and out of contact with a cassette directly by the force of depressing push-buttons, accompanied by a loud mechanical noise, at the time of mode changeover. Another prior art apparatus, which represents an improvement over the previous apparatus, utilizes electrical push-button switches for mode changeover. The latter, however, is costly because of the use of a large-sized electromagnetic plunger, produces a large striking noise and consumes a large amount of electric power, and consequently does not lend itself to a small-sized magnetic recording/reproducing apparatus which uses batteries as the power source.

SUMMARY OF THE INVENTION

The above-described drawbacks in the prior art apparatus have been successfully eliminated by the present invention. According to the invention, mode changeover can be performed by applying a force as small as that required for an electrical push-button switch, with little mechanical noise, and with relatively low consumption of electric power. Further, the apparatus is simple in construction, small in size and economical.

Accordingly, an object of the invention is to provide a magnetic recording/reproducing apparatus for a magnetic tape cassette wherein mode changeover can be performed by push-button operation which requires only a small physical force.

Another object of the invention is to provide a magnetic recording/reproducing apparatus producing little mechanical noise in mode changeover operation.

A further object of the invention is to provide a magnetic recording/reproducing apparatus wherein small electric power is required for mode changeover.

A still further object of the invention is to provide a magnetic recording/reproducing apparatus which is simple in construction, small in size and which costs little to fabricate.

The above and other objects and advantages of the invention will be apparent from the following description taken in conjunction with the accompanying drawings.

DESCRIPTION OF THE PREFERRED EMBODIMENTS

Figure 1A:
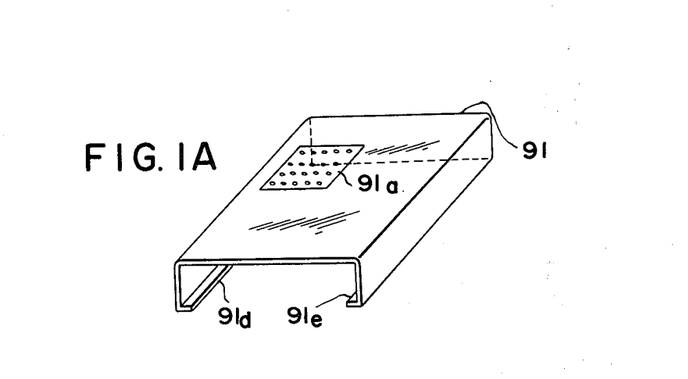
FIG. 1A is a perspective view of a casing for the apparatus of the invention.
Figure 1B:
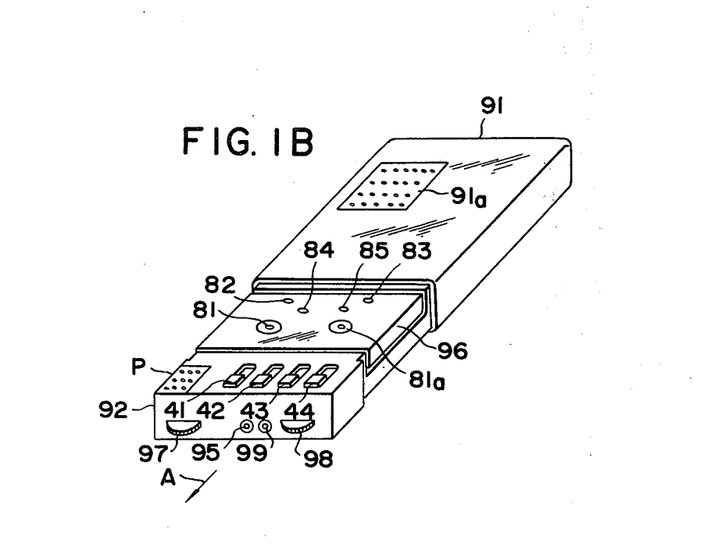
FIG. 1B is a perspective view of the exterior of an apparatus of the present invention adapted to fit the casing of FIG. 1A.

Referring to FIG. 1A, a bottomless casing 91 made by press-forming aluminum plate is provided in its upper wall a group of small holes 91a for the passage of sound from a loudspeaker. The recorder/player body 92 is inserted into the casing 91 as shown in FIG. 1B, right-angular shoulder portions 91d and 91e formed at both sides of the bottom of the casing serving as guides for the insertion of the body 92. FIG. 1B shows the casing 91 with the recorder body fully withdrawn. Referring again to FIG. 1A, when the recorder is pulled outward in the direction of arrow A from the casing, complete removal is prevented by a stop member (not shown). In the state shown in FIG. 1B, a cassette 96 mounted on reel-shafts 81 and 81a can be replaced or turned over. After removing or turning over of the cassette, the recorder 92 can be reinserted into the casing 91 by sliding it in the direction opposite to that indicated by arrow A. Controls for volume and tone 97 and 98 and jacks 99 and 95 for a microphone and an earphone are provided in the front wall of the recorder 92. In the wall of the cassette 96 are provided holes 82 and 83 for receiving a capstan, shown as 24 in FIG. 2, and guide holes 84 and 85 for guide pins (84a and 85a in FIG. 2) mounted on a deck (88 in FIG. 2) for positioning the cassette 96 onto the deck. Either 82 or 83 receives capstan 24, depending on which side of the cassette is utilized. A microphone P is built into the recorder 92, a changeover switch for recording/playback not being shown. Push-buttons 41, 42, 43 and 44 are provided for, respectively, stop, reproduction (or recording), rewind and fast-feed, as will be described hereinbelow in connection with FIG. 2.

Figure 2:
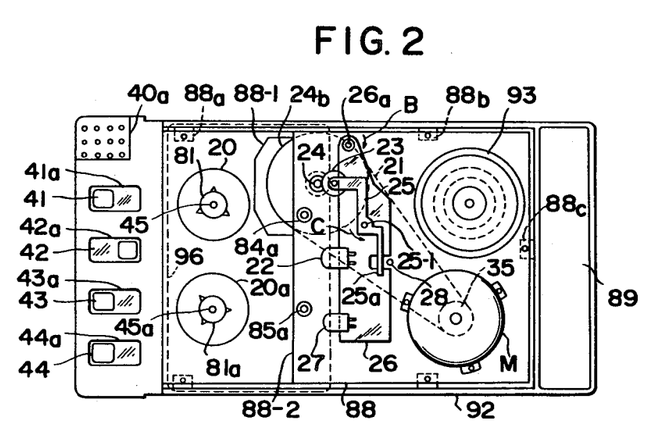
FIG. 2 is a plan view illustrating one embodiment of the internal construction of the body of FIG. 1B.

Referring now to FIG. 2, the internal construction of the body of the recorder 92 will be described. The position of the cassette 96 is indicated by the dotted line. The casing 91 is omitted from the figure. The recorder is provided with a loud speaker 93 mounted within the housing of the body 92 and the housing also provides a space 89 for receiving batteries as the power source. The batteries can be inserted or removed by opening a cover (not shown) on the back of the recorder body 92. A metal deck 88 is affixed to the body 92 by screws or other suitable means at 88a, 88b and 88c. A capstan 24 is rotatably supported by a bearing mounted in the deck 88, and a fly-wheel 24b is integrally fixed to its lower end. Reel-shafts 81 and 81a and reel-stands 20 and 20a are rotatably supported on the deck through shafts 45 and 45a.

An electric motor M is fixed to the deck 88, and is adapted to rotate the fly-wheel 24b by means of a drive belt 21 engaging the rotating shaft of the motor and a pulley 35 fixed to the shaft of fly-wheel 24b. A mounting plate is rotatably supported by a shaft 26a on the deck 88 and carries a magnetic head 22 and an erase head 27. Plate 26 also carries a lever 25 which is pivotally mounted for rotation relative to plate 26. On one end of the lever 25 is provided a pinch roller 23 which is biased against the capstan 24 (biased counterclockwise as shown by arrow C) by a spring (not shown). The plate 26 is itself biased toward clockwise rotation as shown by arrow B by a spring (not shown). Accordingly the pinch roller 23 is adapted to press a magnetic tape against the capstan 24. When plate 26 is rotated counterclockwise the magnetic head 22 and the erase head 27 disengage the tape in cassette 96. At the same time, the free end 25a of the lever 25 is forced against a stop pin 28 mounted on the deck 88, lever 25 is thereby rotated clockwise against the force of the biasing spring to disengage the pinch roller 23 from the capstan 24. Consequently, with a relatively small rotation of the plate 26, the pinch roller 23 is moved to a position remote from the capstan 24. With the plate 26 in the position shown in FIG. 2, the recorder is in the recording/reproducing mode and when the support 26 rotates counterclockwise it is in a non-recording mode. A cut-away portion 88-1 is provided in the deck 88 to accommodate the protrusion of the fly-wheel 24b. The deck 88 is bent at successive right angles at 88-2 with its right-hand portion being stepped up (refer also to FIG. 4). The cassette 96 shown by the dotted line can be inserted by fitting the reels of the cassette over the reelshafts 81 and 81a, and is held in position by guide pins 84a and 85a mounted on the deck 88 which pass through the guide holes 84 and 85 as shown in FIG. 1B.

Figure 3:
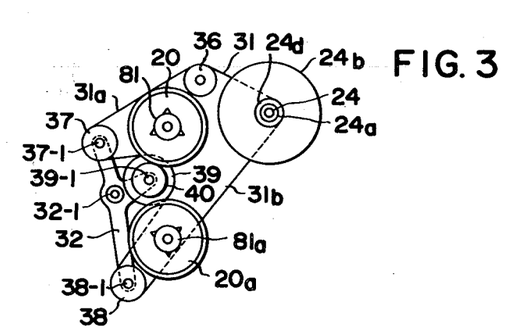
FIG. 3 is a plan view illustrating the mechanism for driving reel-stands of the embodiment of FIG. 2.

Referring now to FIG. 3, the mechanism for driving the reel-stands 20 and 20a will be described. A pulley 24d is fixed to the capstan 24, and the capstan 24 is rotatably supported by a shaft 24a mounted on the deck 88 (refer also to FIG. 4). A generally Y-shaped lever 32 is rotatably supported by a shaft 32-1 mounted on the deck 88, and pulleys 37, 38 and 39 are supported respectively by shafts 37-1, 38-1 and 39-1 mounted on respective arms of the lever 32. A pulley 36, rotatably supported on a shaft mounted on the deck 88, is operably connected to pulleys 24d, 36, 37, 38 and 39 by means of drive belt 31. When the capstan 24 is not rotating the tension in portions 31a and 31b of the belt 31 with respect to the shaft 32-1 are nearly equal. A wheel 40 is operably connected to the pulley 39 by frictional engagement through a conventional slip mechanism. When the capstan 24 rotates counterclockwise, the tension in belt 31b becomes larger than that in portion 31a due to the friction between the pulleys 37, 38 and 39 and their respective shafts and due to the load on the wheel 40 (imposed in driving the reel-stand). As a consequence of the greater tension in 31b the lever 32 rotates counterclockwise causing the wheel 40 to press against a rubber ring or contacting surface provided around the periphery of the reel-stand 20. Accordingly the reelstand 20 is driven in counterclockwise rotation, and the magnetic tape can be taken up by the hub through the reel-shaft 81, thus enabling recording or fast feeding. In the recording mode, wheel 40 slips in contacting pulley 39 enabling the motor M to rotate the capstan 24 at a fixed speed thereby maintaining the linear travel of the tape at a constant speed. When a governor for the motor M is inoperative, the motor is allowed to rotate at a high speed, i.e. in the fast-feed mode. Because the center distances between the shafts 32-1 and 37-1 and between 32-1 and 38-1 are larger than that between the shafts 32-1 and 39-1, the pressing force of the wheel 40 against the reel-stand 20 is relatively large. As a reaction to the force applied in driving the reel-stand 20, the lever 32 is given a counterclockwise torque, and accordingly with an increasing load on the wheel 40, the pressing force of the wheel 40 against the reel-stand 20 will increase proportionality, with the wheel pressing against the reel-stand in a wedging angle relationship.

When the motor M is operated in reverse, the tension in the portion 31a of the belt 31 becomes larger than that in the portion 31b, and accordingly the lever 32 rotates clockwise and thus the wheel 40 rotates clockwise. Consequently the wheel 40 swings in a relief angle away from the reel-stand 20 and presses against the reel-stand 20a in a wedging angle relation. Accordingly the reel-stand 20a is driven clockwise to take up the magnetic tape through the reel-shaft 81a. In this mode (rewind mode), the governor for the motor M is inoperative.

As will be understood from the above description, the forward/reverse rotations of the motor M selectively drive the reel-stands 20 and 20a.

MODE CHANGEOVER — OPERATION

Figure 4:
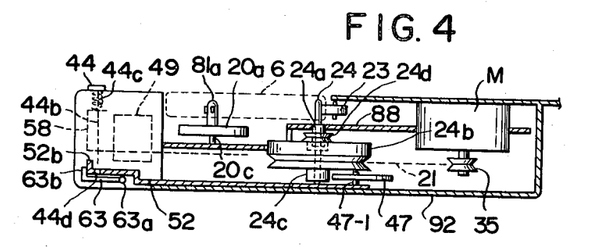
FIG. 4 is a vertical sectional view of the embodiment of FIG. 2.
Figure 5:
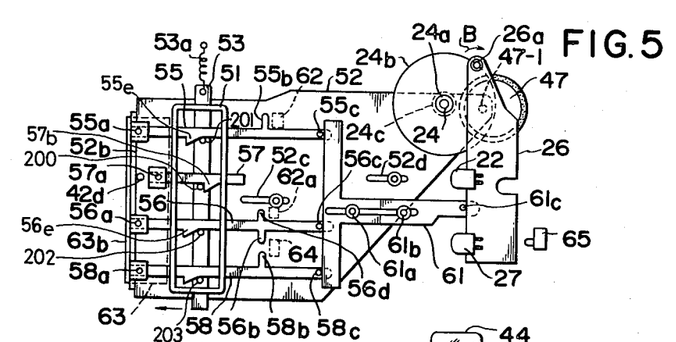
FIG. 5 is a plan view illustrating the mode changeover mechanism of the embodiment of FIG. 2.

Referring now to FIGS. 4 and 5, a mode changeover mechanism, which is a main feature of the invention, will be described. A frame 51 (FIG. 5) is fixed to the main body of the recorder 92. Actuating bars 55, 56, 57 and 58, for effecting changeover to respective modes, are supported by the frame 51 in such a manner that they can move or slide transversely relative to frame 51 (toward the right and left in the FIGURE), and are elastically biased by springs (not shown) in the direction indicated by the arrow (to the left in FIG. 5). A bar 53 is supported by the frame 51 in a manner that it can slide through the frame longitudinally in a path at a right angle to the actuating bars (up and down in FIG. 5) and is biased by a spring 53a upward in FIG. 5. In the mode illustrated by FIG. 5, the actuating bar 57 has been moved rightward and is locked with its right-angular locking shoulder 57e engaged by a lock pin 200 mounted on the bar 53. When the actuating bar 55, for example, is moved toward the right in FIG. 5, its angular protrusion 55e is locked by a lock pin 201 carried by bar 53, and the actuating bar 57 is released from locking engagement and moves leftward. Thus, bars 55, 56, 57 and 58, by rightward movement can be alternatively locked in position by bar 53 and frame 51, which together constitute a well-known alternative-selection mechanism.

Abutting pins 55c, 56c and 58c mounted respectively on the right ends of actuating bars 55, 56 and 58 abut a slidable T-shaped bar 61 which is mounted in a manner as to allow reciprocating sliding movement, between recording and nonrecording positions, i.e. toward the right and left of FIG. 5. Toward this end a slot is provided in the leg of bar 61 through which guide pins 61a and 61b mounted on the deck 88 protrude. A stop pin 61c mounted on the right end of the leg of slide bar 61 abutts the support plate 26. Accordingly, with the rightward movement of one actuating bar, 55, 56 or 58, the support plate 26 is forced to rotate counterclockwise, into a non-recording/reproducing position or mode. The mechanism including the lever 25 and the pinch roller 23 which it carries is omitted from FIG. 5 for simplicity. The ends of the actuating bars 55, 56, 57 and 58 opposite the pin members are each bent upward into a C-shape (refer to FIGS. 4, 5 and 6) and are provided, respectively, with holes 55a, 56a, 57a and 58a. In FIG. 4, the position of the mode-selection mechanism comprising the frame 51 and the bar 53 is indicated by the dotted line 49, and the position of the actuating bar 58 is indicated by a dotted line 58. A push-button rod 44b fixed beneath the push-button 44 passes through holes 58a in the C-shaped portion of actuating bar 57 as shown by the dotted line. Likewise, push-button rods associated with their respective push-buttons 41, 42 and 43 pass, respectively, through holes 55a, 57a and 56a as shown in FIG. 5. The push-buttons 41, 42, 43 and 44 are located respectively in depressions 41a, 42a, 43a and 44a, as shown in FIG. 2 in a manner that the push-buttons can slide right or left in the depressions. A plate member 52 of relatively wide width is mounted in the recorder 92 in such a manner that it can slide reciprocally between extremities of the slots 52c and 52d provided therein. As best seen in FIG. 4, the right-hand end of the plate member 52 carries a shaft 47-1 on which is mounted an accentric idler 47, and the left-hand end of plate 52 is formed into a L-shaped bent portion 52b, which portion 52b is engageable with any of the push-button rods associated with the respective push-buttons. A lever 63, rotatably supported by a shaft 63a mounted in 92, is biased clockwise by a spring (not shown) (refer also to FIG. 6). The entire plate 52 is also spring biased toward the left by spring means (not shown). The leftward movement of the member 52, however, is limited by a right-angle shoulder portion or projection 63b formed at the left end of the lever 63 which abutts against the left end of the member 52. With plate 52 in the position indicated in FIG. 4, where 52b is in contact with 63b, the idler 47 is spaced from wheel 24c which is fixed to the lower end of the capstan 24 and which acts as the capstan drive means.

In FIG. 4, when the push-button 44 is depressed, the push-button rod 44b affixed thereto is pushed through hole 44d in plate 52, thereby engaging lever 63. The lever 63, accordingly, rotates counterclockwise to release the member 52 from locking engagement with the bent portion 63b. As a result, member 52 moves leftward, and accordingly idler 47 comes into contact, through a rubber ring provided around its periphery, with the wheel 24c and is rotated thereby, thus causing the member 52 to move toward the right in FIG. 4, carrying with it the actuating bar 58 which is impaled on the push-button rod 44b and which is also in engagement with the plate 52. By this operation push-button 44 mounted on rod 44b is automatically moved to the right indicating that operation is then in the fast-feed mode. The force required for this movement is relatively large, and larger force effects, by reaction, a corresponding increase in the force of the idler 47 pressing against the wheel 24c, thus making the transmission of drive force between the wheel 24c and the idler 47 surer. When the idler 47 makes about a half rotation, the actuating bar 58 is locked by the alternative-selection mechanism, and a previously locked actuating bar, actuating bar 57 in FIG. 5 for example, automatically moves back leftward. With further rotation of the idler 47, the plate 52 begins to move leftward, and the push-button rod 44b is raised upward by the force of a spring 44c mounted as shown in FIG. 4 and is thereby withdrawn from the hole 44d. Upon another half rotation of the idler 47, the member 52 travels further to the left and returns to the position wherein its left end is abutted against the bent portion 63b of the lever 63. The mechanism described above is so designed that member 52 is returned to the position wherein 52b abutts 63b by only a slight degree of rotation, less than one full rotation, of the idler 47, and accordingly the idler 47, upon an additional small increment of rotation, is withdrawn from engagement with the wheel 24 and therefore the rotation of idler 47 automatically stops.

As will be understood from the above description, upon depression of the push-button 44, the actuating bar 58 is moved rightward by the capstan power means and locked there, whereas the previously engaged actuating bar is released and moves back to the left.

Other mechanisms associated with the other push-buttons 41, 42 and 43 are similar to the above and operate in the manner described. Accordingly, upon depression of any one of the push-buttons, the corresponding actuating bar, through the corresponding push-button rod, is moved to the right and locked.

FIG. 5 illustrates the positions of the component parts with the recorder in the playback or recording mode, i.e. with the capstan 24 and the pinch roller 23 (FIG. 4) pressing together to pinch a magnetic tape therebetween, and with the magnetic head 22 in contact with the magnetic tape. In this recording mode the capstan 24 is rotated (by the motor) counterclockwise, and the magnetic tape is taken up on the cassette reel engaging the reel-shaft 81 as described in connection with FIG. 3.

FAST-FEED MODE

Upon depression of push-button 44, as described in more detail above, the actuating bar 58 moves to the right into locking engagement with pin 203, and the actuating bar 57 moves back leftward. At the same time, the abutting pin 58c pushes the bar 61 toward the right in FIG. 5, and this motion is transmitted through T-bar 61 and pin 61c causing support plate 26 to rotate counterclockwise. Accordingly, the pinch roller 23, the magnetic head 22 and the erase head 27 are moved to a position remote from the cassette. A projection 58b, provided on actuating bar 58, depresses an electric switch 64 which renders the governor for the motor M inoperative, and allows the motor M to rotate at high speed, thus switching to fast-feed mode.

REWIND MODE

Upon depression of the push-button 43 (FIG. 2), the actuating bar 56 moves to the right to a position where shoulder portion 56e locks over pin 202, and actuating bar 58 is released and returns leftward. The bar 61 remains in its rightmost position, now held by the abutting pin 56c, and, accordingly, support plate 26 remains in position with heads 22 and 27 displaced from contact with the magnetic tape, a non-recording mode. This movement of bar 56 also causes a projection 56d, provided on the actuating bar 56, to push an electric switch 62a, rendering it operative, while the switch 64 is held in its operative position by projection 56b. The switch 62a is the reverse-drive switch for the motor M, and accordingly the rotation of the motor M reverses, thus switching to the rewind mode whereby the magnetic tape is taken up at high speed by operation of the reel-shaft 81a as described in connection with FIG. 3.

RECORDING/REPRODUCING MODE

When push-button 42 (FIG. 2) is depressed, the actuating bar 57 is moved to the right by push-button rod 42b and locked. At the same time, the previously locked actuating bar 56 is released and moves left, the switches 62a and 64 become inoperative, and consequently the motor M rotates in the forward direction at the normal governor-controlled fixed speed. At the same time, the bar 61 returns to the left, and accordingly the support plate 26 rotates clockwise to the reproduction position. A through-hole 42d is provided in plate member 52, as shown in FIG. 5, for the purpose of permitting the lower end of the push-button rod 42b to pass through the plate 52 to push the lever 63 to relieve the locking engagement of plate 52.

The recorder/player is also provided with conventional recording and reproducing electrical circuits connected to the recording-reproducing head and an appropriate switch (not shown), which may optionally or additionally include a remote control switch, for selectively activating the recording or reproduced circuitry when the apparatus is in the recording/playback tape drive mode. Since this circuitry is conventional and forms no part of the present invention its description has been omitted.

STOP MODE (PUSH-BUTTON 41)

Then, upon the depression of the push-button 41 (FIG. 2), the associated push-button rod 41b releases the member 52 from locking engagement, and the member 52 makes one reciprocating movement through the rotation of the idler 47, and the actuating bar 55 is moved to the right and locked there on its shoulder portion 55e. At the same time the actuating bar 57 is released, moves back leftward and an electric switch 62 is opened by a projection 55b provided on the actuating bar 55. The support plate 26 is rotated counterclockwise by abutting pin 55c and the bar 61 is thus moved to the non-reproduction position. At this time, an electric switch 65 is opened by the plate 26 which strikes the switch actuator. The switches 65 and 62 are source line switches, and are connected in parallel, thus forming an AND circuit. Accordingly, by closing any one of these switches, electric power is supplied to the apparatus from the source, and the power supply is shut off only when both the switches open. In the above-described mode, both switches 65 and 62 are open, and there is no power supply, thus giving the stop mode. The idler 47, at this moment, has just made a half rotation, and continues rotation by the inertia of the fly-wheel 24b. When the idler 47 has made a further half rotation, the plate 52 abuts against the bent portion 63b of the lever 63, and the idler 47, no longer in contact with wheel 24c, stops rotation automatically.

As will be understood from the above description, by depression of the appropriate push-button, 41, 42, 43 or 44, the recorder is switched to the desired mode of stop, reproduction, rewind or fast-feed. The push-buttons can be depressed by a small force, only as large as necessary to overcome the force of the spring 44c, for example. The spring which biases the member 52 leftward may be a light spring and, accordingly, the member 52 can be released from locking engagement with lever 63 by application of only a small force, because, when the member 52 has moved leftward and the idler 47 has come into contact with the wheel 24c, the idler is subject to substantially no load and can rotate lightly. It is when the member 52 begins to move rightward by the rotation of the idler 47 that the load on the idler begins to increase. As will be understood from the foregoing, mode changeover is effected by utilizing the capstan power means which is stable and sure, at a low speed in a predetermined period of time, and accordingly the operation is sure and accompanied by little mechanical noise. Further, the mode changeover mechanism enables production of a tape player and/or recorder that is simple in construction economical to manufacture, small in size and flat shaped. Further, as seen in FIG. 2, the push-button 42, for example, is automatically moved to the right where it remains during the recording or playback mode, and accordingly the mode of operation is readily apparent to visual observation.

Figure 6:
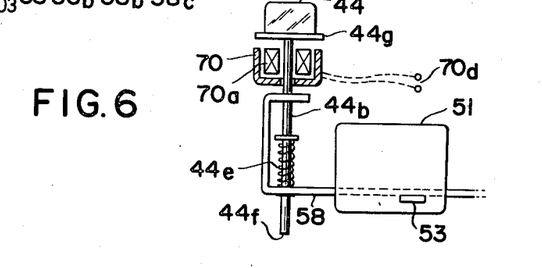
FIG. 6 is a side view illustrating another type of push-button mechanism.

FIG. 6 shows another type of push-button mechanism. The construction of the embodiment illustrated in FIG. 6 is generally similar to that of FIG. 4 except with respect to the following. A compressed spring 44c is provided on the push-button rod 44b affixed to push-button 44 to urge the rod upward and the coil 70a and soft steel yoke 70 of an electromagnetic device are disposed around the push-button rod 44b. A soft steel plate 44g is fixed to the underside of the push-button 44. The yoke 70 is fixed to the frame of the recorder. Upon manual depression of the push-button 44, the lever 63, the member 52 and the actuating bar 58 are operated in the manner discussed in connection with FIG. 44, thus changing over to the fast-feed mode. Alternatively, by supplying current for a short period of time through terminals 70d by closing a suitable switch (not shown), the plate 44g is attracted toward the yoke and the push-button rod 44b with push-button 44 are lowered thus initiating changeover to the fast-feed mode by the previously described action of the lower end 44f of the rod 44b. Since the lowering of the push-button rod 44b requires only the small force necessary to overcome the elastic force of the light spring 44e, the required current is small and the electromagnetic device may be small and light. Similar electromagnetic devices may be associated with the other push-buttons 41, 42 and 43 (FIG. 2), thereby any mode changeover can be performed with a small power input through electric switches. Accordingly remote control is easily accomplished.

EMBODIMENT NO. 2

Figure 7A:
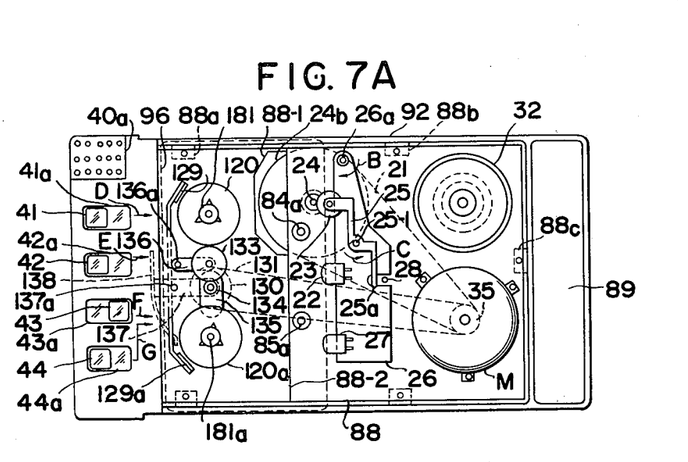
FIG. 7A is a plan view of another embodiment of the internal construction of the apparatus of FIG. 1B.
Figure 7B:
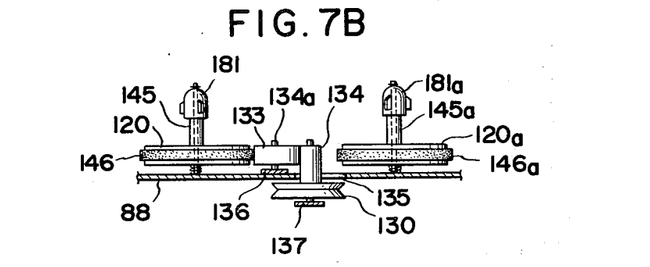
FIG. 7B is a side view illustrating the mechanism for driving reel-stands in the embodiment of FIG. 7A.
Figure 7C:
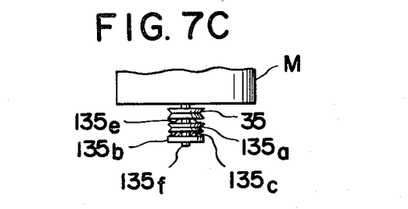
FIG. 7C is a side view illustrating accessory parts of the motor drive used in the embodiment of FIG. 7A.

Referring now to FIG. 7A and 7B, another embodiment of the invention, will be described. Similar numerals indicate like parts which operate as described in connection with the above-described embodiment. As is best seen in FIG. 7B, reel-shafts 181 and 181a and reel-stands 120 and 120a are rotatably mounted on deck 88 through shafts 145 and 145a. Upon insertion of a cassette 96 as indicated by the dotted line in FIG. 7A, the hubs in the cassette fit respectively reel-shafts 181 and 181a. There are provided brake members 129 and 129a which press against the peripheries of the reel-stands 120 and 120a to brake them, the detailed description of which will be given in connection with FIG. 13. Means for driving the reel-stands 120 and 120a is as follows. Referring to FIGS. 7A and 7B, an idler 133 is pivoted on the free end of the lever 136 rotatably supported on the deck 88 through a shaft 136a. A lever 137 is rotatably supported by a shaft 137a mounted on the backside of the deck 88. A sleeve 134 and a pulley 130, integral therewith, are rotatably supported by a shaft 134a mounted on the free end of the lever 137. The sleeve 134 protrudes through a cut-away portion 135 of the deck 88. A plate spring 138 is fixed near its center to the left end of the lever 137. The reel-shafts 181 and 181a are integral with the reel-stands 120 and 120a respectively, and are rotatably supported respectively by the shafts 145 and 145a mounted on the deck 88. Referring to FIG. 7C, the drive shaft 135f of the motor M carries pulley 35 and disc 135b which are rigidly secured thereto and a pulley 135a which is loosely fit. A felt sheet 135c is interposed between the pulley 135a and the disc 135b, and the pulley 135a is elastically pressed through the felt sheet 135c against the disc 135b by means of a plate spring 135e. Thus the pulley 135a rotates with the shaft 135f through frictional engagement with disc 135b. A rubber drive belt 131 operably connects pulley 135a and the pulley 130 (FIG. 7B).

RECORD/PLAYBACK

While the detailed description of the mechanism operated by means of the push-buttons will be given below in connection with FIGS. 8 and 9, upon depression of the push-button 43, the push-button 43 is automatically moved rightward to the position shown in FIG. 7A. At the same time, the plate spring 138 is elastically bent rightward in the direction of arrow F (FIG. 7A) and, in reaction, the lever 137 is rotated counterclockwise. As a result, the sleeve 134 presses the idler 133 against a rubber ring 146 provided around the periphery of the reel-stand 120. The sleeve 134 is being rotated counterclockwise through the pulley 130 and the rubber drive belt 131, and consequently the reel-stand 120 is driven counterclockwise. Accordingly, the magnetic tape being driven by the capstan 24 and the pinch roller 23 is taken up by the hub on the reel-stand 120, and thus playback can be obtained through the magnetic head 22. Sufficient slip occurs between the pulley 135a and the rotating shaft 135f (FIG. 7C), to allow for co-ordination between the tape drive (the capstan) and the drive of the reel-stands.

STOP

Upon depression of the push-button 41, the deflection of spring 138 in the direction of arrow F is released, the push-button 41 is automatically moved rightward in the direction of arrow D (FIG. 7A), the push-button 43 automatically moves back leftward, and the support plate 26 is rotated counterclockwise in the direction of arrow D. Accordingly the pinch roller 23 is moved away from the capstan 24, and the magnetic head 22 and the erase head 27 are displaced from the cassette 96. At the same time the current is shut off.

REWIND MODE

Then, upon depression of the push-button 42, the push-button 42 is moved rightward, and the push-button 41 moves back leftward. The plate spring 138 is deflected to the right in the direction of arrow E, and accordingly the lever 137 is pivoted clockwise. Sleeve 134 is thereby pressed against a rubber ring 146a provided around the periphery of the reel-stand 120a to rotate it clockwise. The support 26 is kept at its counterclockwise driven position by the force applied in the direction of arrow E. At this time, the governor for the motor M is rendered inoperative, and accordingly the motor M rotates at a high speed of, for example, four to six times the normal speed. As a result, the magnetic tape is taken up by the hub through the reel-stand 120a.

FAST FEED MODE

Upon depression of the push-button 44, the push-button 44 is moved rightward, and the push-button 42 moves back leftward. The plate spring 138 is deflected rightward in the direction of arrow C, and the reel-stand 120 is driven to take up the magnetic tape. The support plate 26 is kept at its counterclockwise driven position by the force applied in the direction of arrow C. The governor is rendered inoperative, to enable fast-feed.

GENERAL OPERATION OF EMBODIMENT OF FIGS. 7–9

Figure 8:
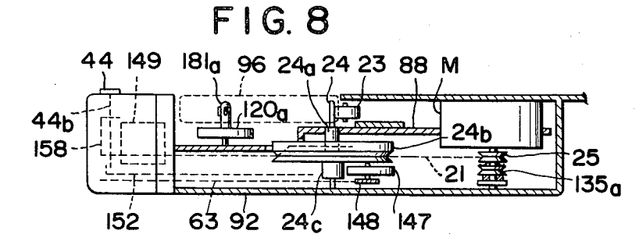
FIG. 8 is a vertical sectional view of the embodiment of FIG. 7A.
Figure 9:
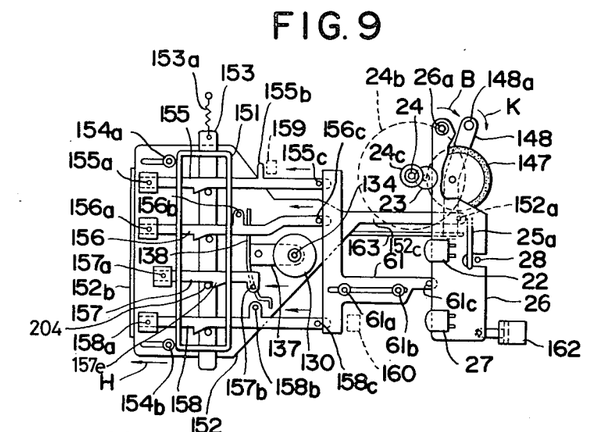
FIG. 9 is a plan view illustrating still another embodiment of the mode changeover mechanism of the present invention.

Referring now to FIGS. 8 and 9, a detailed description of the mechanism for the above-described operation will be given. A frame 151 is fixed to the recorder/player body 92, and actuating bars 155, 156, 157 and 158 are supported by the frame 151 in a manner that they can slidably move between right and left positions, the actuating bars being biased to the left by springs (not shown). A bar 153 is supported by the frame 151 in a manner that the bar can slidably move between two positions, up and down in FIG. 9, and is biased upward by a spring 153a. In the state shown in FIG. 9, the actuating bar 157 is locked by its step-shaped shoulder portion 157e engaging a stop pin 204 mounted on the bar 153. When the actuating bar 155 is moved right, bar 155 becomes locked in a similar manner, and the actuating bar 157 is released from locking engagement moves back leftward. Thus, when any one of the actuating bars 155, 156, 157 or 158 is moved rightward, that bar is selectively locked in that position. This alternative-selection mechanism is conventional in the art.

Abutting pins 155c, 156c and 158c are mounted respectively on the right ends of the actuating bars 155, 156 and 158 for engagement with the slidable T-bar 61. The T-bar 61 is supported on the deck 88 in a manner that the bar 61 can slide to the right and left between the extremities of a slot provided therein through which protrude guide pins 61a and 61b mounted on the deck 88. The leg of T-bar 61 carries an abutting pin 61c for engaging the rotatable support plate 26. Accordingly, upon the rightward movement of any one of the actuating bars 155, 156 or 158, the support is pushed for counterclockwise rotation into a non-reproducing position or mode. A projection or nib 156b, provided near the center of the actuating bar 156, and a similar projection 157b, provided at the right end of the actuating bar 157, each carry pins for engaging and deflecting respective ends of the plate spring 138 upon movement of 156 or 157 to the right. Accordingly, actuating bar 156 is moved to the right, the lever 137 is pivoted clockwise and sleeve 134 is thereby biased against ring 146a to drive the reel-shaft 181a (FIG. 7A). Likewise, upon movement of actuating bar 157 to the right, the lever 137 is pivoted counterclockwise bringing the sleeve 134 into contact with idler 133 to drive the reel-shaft 181. A lever 148 (FIG. 9) is pivotally mounted at one end on a shaft 148a fixed to the recorder body 92, and is elastically biased by a spring (not shown) clockwise in the direction of arrow K. An eccentric idler 147 is rotatably mounted near the center of lever 148. Beneath fly-wheel 24b a wheel 24c is mounted on the capstan shaft 24a. Thus idler 147 is moved into and out of contact with wheel 24c by the pivotal motion of lever 148. A plate member 152 is mounted in the recorder body 92 in a manner to allow reciprocating sliding movement between the extremities of two slots through which guide pins 154a and 154b (fixed to the housing of the recorder) respectively protrude. An abutting pin 152a is provided on the end of a leg-like extension 152c of plate 152 for engaging against the left side of the free end of the lever 148. In the bent or C-shaped portions at the left ends of the actuating bars 155, 156, 157 and 158 there are provided respectively holes 155a, 156a, 157a and 158a through which the respective push-button rods associated with the push-buttons 41, 42, 43 and 44 (FIG. 7A) pass freely. In FIG. 8, the push-button 44, the push-button rod 44b and the actuating bar 158 are shown by dotted lines. The alternative-selection mechanism comprising the frame 151 and the bar 153 is shown by dotted line 149. In FIG. 9, the left end of the member 152 is bent upward to form a right-angle shoulder portion 152b adapted to engage the lower ends of the push-button rods.

Figure 10:
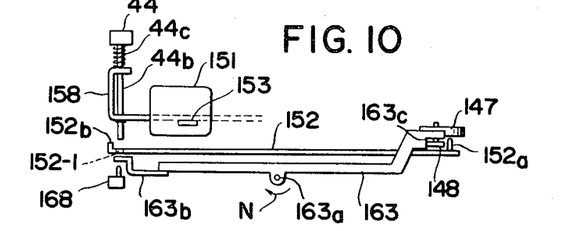
FIG. 10 is a side view illustrating in detail a part of the mechanism of FIG. 9.

Because the operation of the respective push-buttons are similar to one another, only the operation of the mechanism associated with push-button 44 will be described in detail with reference to FIG. 10. The push-button rod 44b freely passes through holes 158a (FIG. 9) provided at the left C-shaped end of actuating bar 158, and is lightly biased upward by the spring 44c. The numeral 151 indicates the fixed frame of the alternative-selection mechanism. Beneath plate 152 there is a lever 163 pivotally mounted near its center on a shaft 163a. The lever 163 is biased clockwise in the direction of arrow N, by a spring (not shown) and engages the free end of lever 148 in a notch 163c provided at one end. The left end of plate 152 comes into contact with the lower end of the push-button rod 44b only when the pushbutton 44 is depressed. The push-button rod 44b can be forced against extension 163b of the lever 163 by passing through a hole 152-1 provided in plate 152. Accordingly, depression of the push-button rod 44b pivots the lever 163 counterclockwise about the shaft 163a against the biasing force of the spring which is in the direction of arrow N, thus releasing the lever 148 from locking engagement with notch 163c at the right end of the lever 163. Consequently the lever 148 in FIG. 9 rotates clockwise bringing the eccentric idler 147 into contact with the wheel 24c (FIG. 8). As the idler 147 is eccentrically rotated by wheel 24c, the lever 148 is driven counterclockwise, thus engaging pin 152a and thereby moving plate 152 to the right. Consequently the right-angle shoulder 152b is brought against the lower end of the push-button rod 44b and thereby carries the push-button 44 and rod 44b and the actuating bar 158 to the right. The motion of bar 158 to the right is transmitted through pin 158c, bar 61, and pin 61c to pivot the support plate 26 counterclockwise. As a result, the pinch roller 23, the magnetic head 22 and the erase head 27 are moved to a position remote from the cassette. At the same time, the pin in nib 158b pushes against the adjacent end of the plate spring 138, and accordingly the lever 137 is rotated counterclockwise into the fast-feed position or mode. The above-described motion is effected with about a half rotation of the idler 147. During this rotation the idler 147 is subjected to a large load, and in reaction thereto, the idler 147 is pressed snugly against the wheel 24c resulting in a secure engagement. The spring which biases lever 148 in the direction of arrow K may be a light spring, because at the start of rotation of the idler 147 there is little load on the idler and therefore a small force pressing the idler 147 against the wheel 24c is sufficient. Accordingly the force on push-button 44 required to release the lever 148 from locking engagement may be small. The driving force for movement of the support plate 26, which is the source of the major part of the load on the idler 147, is derived from the capstan power means, and therefore offers the advantage that this driving force is independent of the force required to depress the push-button 44. Upon movement to the right as described above, the actuating bar 158 is locked by the alternative-selection mechanism. Upon further half rotation of the idler 147, the lever 148 pivots back clockwise and again comes to rest in notch 163c of the lever 163. The idler 147, upon further slight rotation, loses contact with the wheel 24c and automatically stops rotation. With the T-bar 61 (FIG. 9) moved to the right, an electric switch 160 shown by dotted line is rendered operative. This switch 160 renders the governor for the motor M inoperative, and therefore the motor M rotates at high speed for the fast-feed mode. Since the push-button 44 remains at the right end of the depression, the fast-feed mode can be visually detected As will be understood from the above description, by means of the present invention, the force required to depress the push-button 44 is small, the mode change-over operation may be carried out in about ⅓ second, for example, and little mechanical noise is produced because there is no striking motion. These advantages also accompany operation of the other push-buttons 41, 42 and 43. Upon depression of the push-button 41, for example, the lever 148 is released from the locking engagement with the lever 163, and accordingly the idler 147 makes one rotation and stops. The push-button 41 and the actuating bar 155 are moved to the right and locked there. Accordingly, a non-reproducing mode is achieved, and the actuating bar 158 and the push-button 44 are returned to the left by spring action. A source line switch 159 indicated by the dotted line in FIG. 9 is closed by engagement with the nib projection 155b to shut off current supply. The idler 149, however, makes a further half rotation due to the inertia of the fly-wheel 24b and the motor M, and then stops, i.e. in the "stop mode". The left end 163b of the lever 163 shown in FIG. 10 is sufficiently wide to be engaged by any one of the push-button rods, thus the lever 163 can be pivoted by depressing any one of the push-buttons.

Then, upon depression of the push-button 43, the actuating bar 157 is moved rightward and locked there, and the push-button 41 and the actuating bar 155 move back leftward. With depression of the push-button 43, an electric switch 168 shown in FIG. 10 is depressed to supply current from the source, and the motor M begins to rotate, thus initiating the above-described movement. When the push-button rod moves upward (and then to the right) the left end 163b of lever 163 rotates clockwise and switch 168 is released and opened. By this time, however, the actuating bar 155 (FIG. 9) has moved back leftward to close the switch 159, enabling further operation.

With the leftward movement of the actuating bar 155, the support plate 26 is allowed to rotate clockwise (by spring force), and the pinch roller 23 comes into contact with the capstan 24, and the magnetic head 22 with the magnetic tape, thus placing the apparatus in the recording/reproduction mode. An air cylinder 162 (FIG. 9) may optionally be attached to the support plate 26 to damper to some degree the speed of the above-described spring motion and to thereby reduce mechanical noise further.

Upon depression of push-button 42, the apparatus is converted to the rewind mode through a similar operation.

Figure 11:
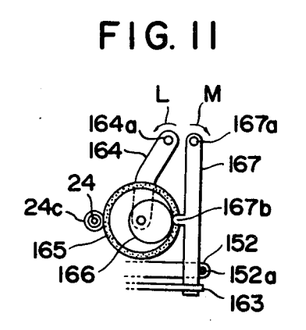
FIG. 11 is a plan view illustrating an alternative mechanism for transmitting motion from the capstan power means to the mode changeover mechanism of the invention.

The power for driving the idler 147 may optionally be obtained also from an alternative capstan power means. FIG. 11 shows another means for transmitting the driving force of capstan wheel 24c to the mode changeover mechanism by using a noneccentric idler 165. A lever 164 is rotatably supported at one end on a shaft 164a, and the idler 165 (non-eccentric) is pivoted on the free end of the lever 164. The lever 164 is elastically biased by a light spring counterclockwise in the direction of arrow L (in the direction away from the wheel 24c). To the idler 165 is integrally fixed an eccentric cam 166. A lever 167 is rotatably supported at one end by a shaft 167a, and is elastically biased by a light spring clockwise in the direction of arrow M. The free end of the lever 167 is in engagement with the abutting pin 152a carried by the leg of member 152, and is restrained against clockwise pivotal motion by locking engagement with the notch in the free end lever 163. Upon depression of any one of the push-buttons 41, 42, 43 and 44, the lever 167 is released from locking engagement with the lever 163 and rotates clockwise, and thus a projection 167b provided near the center of the lever 167 is pushed against the surface of cam 166. Consequently the idler 165 is pressed against the capstan wheel 24c and thereby caused to rotate. With about a half rotation of the cam 166, which is forced by rotation of the idler 165, the lever 167 rotates counterclockwise to move the member 152 to the right into the position shown in FIG. 11. With an additional half rotation of the cam 166, the lever 167 returns to its original position and is again locked there by lever 163. A further small degree of rotation of the cam 166 causes it to break contact with the projection 167b, and accordingly the idler 165 moves rightward away from the wheel 165 and stops rotation. Thus, a similar effect as in the above-described example utilizing the eccentric idler is obtained.

Figure 12:
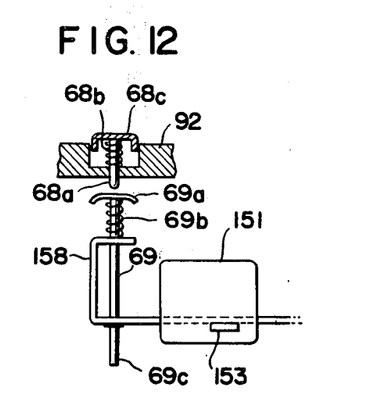
FIG. 12 is a side view illustrating still another embodiment of push-button mechanism.

FIG. 12 illustrates another embodiment of a push-button mechanism. The push-button shown corresponds to that of FIG. 10 and is for fast-feed. A depression formed in the housing of the apparatus 92, contains a vertically slidable push-button 68c and a spring 68b for elastically biasing the push-button 68c upward. Under the push-button 68c, are located the actuating bar 158, the fixed frame 151 and the bar 153 of the alternative-selection mechanism. A vertically slidable rod 69 impales the left C-shaped end of the actuating bar 158, and is elastically biased upward by a spring 69b. On the top of the rod 69, is provided a cap-like plate 69a which abutts against the lower end of a second push-button rod 68a fixed to the push-button 68c. Upon depression of the push-button 68c, the rod 69 is forced downward and the lower end 69c of the rod 69 comes down to a position engageable with the right-angle shoulder portion 152b of the member 152 (FIG. 10). With the downward motion of the rod 69, the lever 163 is pivoted counterclockwise to release the lever 148 from notch 163c. Accordingly the idler 147 makes one rotation and then stops, during which rotation the member 152 is moved to the right by the force coveyed from lever 148 to the abutting pin 152a, and accordingly the rod 69 and the actuating bar 158 are moved to the right and locked there, thus changing over to fast-feed mode in a manner similar to that described in connection with FIGS. 9 and 10. An operational difference between the push-button mechanism of FIGS. 10 and 12 is that the push-button 68c in FIG. 12 does not move to the right following the actuating bar 158. In this embodiment the mechanisms associated with the other push-buttons 41, 42 and 43 (FIG. 9) are of similar construction, and accordingly mode changeovers to reproduction, stop and rewind can be effected in the same manner.

Figure 13:
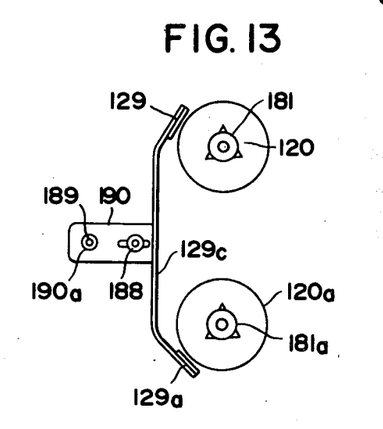
FIG. 13 is a plan view illustrating a braking mechanism for the reel-stands.

Referring now to FIG. 13, means for braking the reel-shafts 181 and 181a will be described. The brake means is conventionally an electromagnetic plunger, and accordingly is large in size and costly, and, because of its large consumption of electric power, is unsuitable for a portable magnetic (tape recorder/player) which utilizes batteries as the power source. In the invention, wherein the operation of mode changeover takes some period of time (about a half to a third of a second, for example), however, braking can be effected in a sure manner with a simple mechanism by utilizing the reciprocating movement of plate member 152 (FIG. 9). Accordingly, in the invention, by adopting brake means, changeover from the fast-feed mode to the reproduction mode can be performed smoothly without tangling the magnetic tape ("backlash").

In FIG. 13, an elastic plate 129c is provided at both ends with the brake shoes 129 and 129a which abut respectively the reel-stands 120 and 120a. The plate 129c is fixed near its center to a bar 190 which is supported by the deck 88 (FIG. 7A) in a manner that it can slide to the left and right between the extremities of a slot provided therein which receives a guide pin 188 mounted on the deck 88. An abutting pin 189 mounted on plate member 152 passes loosely through a hold 190a provided in bar 190. Upon the rightward movement of the member 152, the brake members 129 and 129a are, through the abutting pin 189, the bar 190 and the plate 129c, pressed against the reel-stands 120 and 120a to brake them, and, upon leftward movement of the member 152, the braking action is relieved. Accordingly, the reel-stands 120 and 120a are subjected to braking only during the time when mode changeover operation takes place. Though temporary, the strong force of the rightward movement of the member 152 provides sure and strong braking.

While only preferred embodiments have been described, it is to be understood that various changes and modifications may be made without departing from the spirit and scope of the invention.

We claim:

1. A magnetic tape recording/reproducing apparatus having a plurality of push-buttons for directing changeover of tape-drive modes, said apparatus comprising:
   a housing adapted to receive a magnetic tape disposed on a pair of reels;

capstan means rotatably mounted in said housing for transport of the tape at a predetermined linear speed;

an electrical motor mounted within said housing for driving said capstan means;

a pair of reel stands for mounting the tape reels;

means operably connected to said motor for alternatively driving one of said reel stands;

an idler mounted for movement into and out of contact with said capstan means;

means for biasing said idler toward said capstan means;

a reciprocating member mounted for movement between two positions responsive to said movement of said idler;

means for locking said idler in a position out of contact with said capstan means;

release means, responsive to depression of a first push-button, for release of said locking means, thereby allowing said biasing means to bring said idler into contact with said capstan means for one rotation by which rotation said idler is moved out of contact with said capstan means and temporarily held there by said locking means;

a plurality of slidable actuating bars, one for each tape drive mode, mounted for reciprocating movement between two positions;

means associated with each actuating bar for changing the tape drive mode responsive to said actuating bar movement;

means for biasing each actuating bar toward a first position;

actuating bar engaging means responsive to the depression of any one of said push-buttons for selectively engaging the one actuating bar associated with that push-button for movement with said reciprocating member to a second position; and alternative-selection means, responsive to said reciprocating movement of said one actuating bar, for locking said actuating bar in said second position and releasing another actuating bar previously locked in said second position.

2. The magnetic recording/reproducing apparatus of claim 1 wherein said idler is eccentrically shaped.

3. The magnetic recording/reproducing apparatus of claim 2 wherein said idler is rotatably mounted on said reciprocating member, and said biasing means is a spring member connected to said reciprocating member.

4. The magnetic recording/reproducing apparatus of claim 1 wherein said locking means includes a pivotally mounted lever having a projection for engaging said reciprocating member to lock said reciprocating member against the biasing force.

5. The magnetic recording/reproducing apparatus of claim 1 wherein said locking means includes a pivotally mounted lever having a projection for engaging said reciprocating member to lock said reciprocating member against the biasing force, and said release means includes a plurality push-button rods, one end of each rod disposed to receive the force of depression of the associated push-button and the opposite end adapted to engage said lever to rotate same.

6. The magnetic recording/reproducing apparatus of claim 1 wherein said alternative-selection means includes right-angle engaging projections provided on each of said actuating bars and a slide bar movable in a direction perpendicular to the direction of the movement of said actuating bars, said slide bar having protruding pins for engaging respectively the said engaging projections of said actuating bars to lock said actuating bars.

7. The magnetic recording/reproducing apparatus of claim 1 wherein said actuating bar engaging means, for selectively engaging the actuating bars with the reciprocating member, includes a plurality of push-button rods, one rod associated with each actuating bar and each rod passing through at least one hole provided in one end of the corresponding actuating bar and, upon depression of the corresponding push-button, entering a hole or depression in said reciprocating member for engagement therewith.

8. The magnetic recording/reproducing apparatus of claim 2 wherein said eccentrically-shaped idler is mounted on a pivotal lever, and said biasing means for biasing the idler toward the capstan means is a spring connected to said pivotal lever.

9. The magnetic recording/reproducing apparatus of claim 8 wherein said locking means includes a second pivotal lever which engages the first mentioned pivotal lever.

10. The magnetic recording/reproducing apparatus of claim 9 wherein said release means includes a plurality of push-button rods, each of said rods associated with a push-button and adapted engage and pivot said second pivotal lever upon depression of the associated push-button.

11. The magnetic recording/reproducing apparatus of claim 1 wherein said idler is a concentric idler and has an eccentric cam fixed securely thereto, said apparatus further comprising a cam follower for engaging said eccentric cam and said reciprocating member so as to translate the camming action into the movement of said reciprocating member.

12. The magnetic recording/reproducing apparatus of claim 11 wherein said concentric idler and said eccentric cam are pivotally supported on a lever, said lever being provided with a second biasing means for urging said idler away from said capstan means, and the first mentioned biasing means, which urges said idler toward said capstan means, consisting of a spring connected to and biasing said cam follower against said eccentric cam in a direction to press said idler against said capstan means.

13. The magnetic recording/reproducing apparatus of claim 12 wherein said locking means consisting of a separate pivotally mounted lever which engages and locks said cam follower.

14. The magnetic recording/reproducing apparatus of claim 1 additionally comprising a plurality of electromagnetic devices, each device associated with one of the push-buttons and each consisting of a magnetic material and an exciting coil, whereby remote control may be performed by supplying said coil with electric current.

15. The magnetic recording/reproducing apparatus of claim 1 wherein said actuating bar engaging means includes a plurality of push-button rods, each rod being divided into two sections, one section being fixed to the corresponding push-button and a second section passing through at least one hole provided in the corresponding actuating bar and, in response to depression of the push-button, entering a hole or depression in said reciprocating member, so that only the second section moves with the reciprocating motion of said actuating bar.

16. The magnetic recording/reproducing apparatus of claim 1 additionally comprising braking means mounted for movement into and out of contact with said reel stands responsive to the movement of said reciprocating member.

17. In a magnetic recording/reproducing apparatus, the improvement consisting of reel-stand drive means comprising:
- a lever rotatably supported by a centrally located shaft, said lever having at least three arms;
- a first pulley and an idler mounted for synchronous rotation on one of said lever arms;
- second and third pulleys rotatably mounted respectively on second and third arms of said lever, said lever being nearly symmetrical with respect to a line passing through the central points of said first pulley and said shaft, the center distances between said second pulley and said shaft and between said third pulley and said shaft both being larger than the center distance between said first pulley and said shaft;
- a fourth pulley associated with a capstan and driven by a motor;
- a drive belt wound around said first, second, third and fourth pulleys; and
- a pair of reel stands disposed on either side of said idler so that upon rotation of said drive belt in one direction by said motor-driven fourth pulley, said lever rotates clockwise to press said idler against one reel stand and upon rotation of the drive belt in the opposite direction, said lever rotates counterclockwise to press said idler against the other reel stand.

* * * * *